United States Patent Office 3,469,461
Patented Sept. 30, 1969

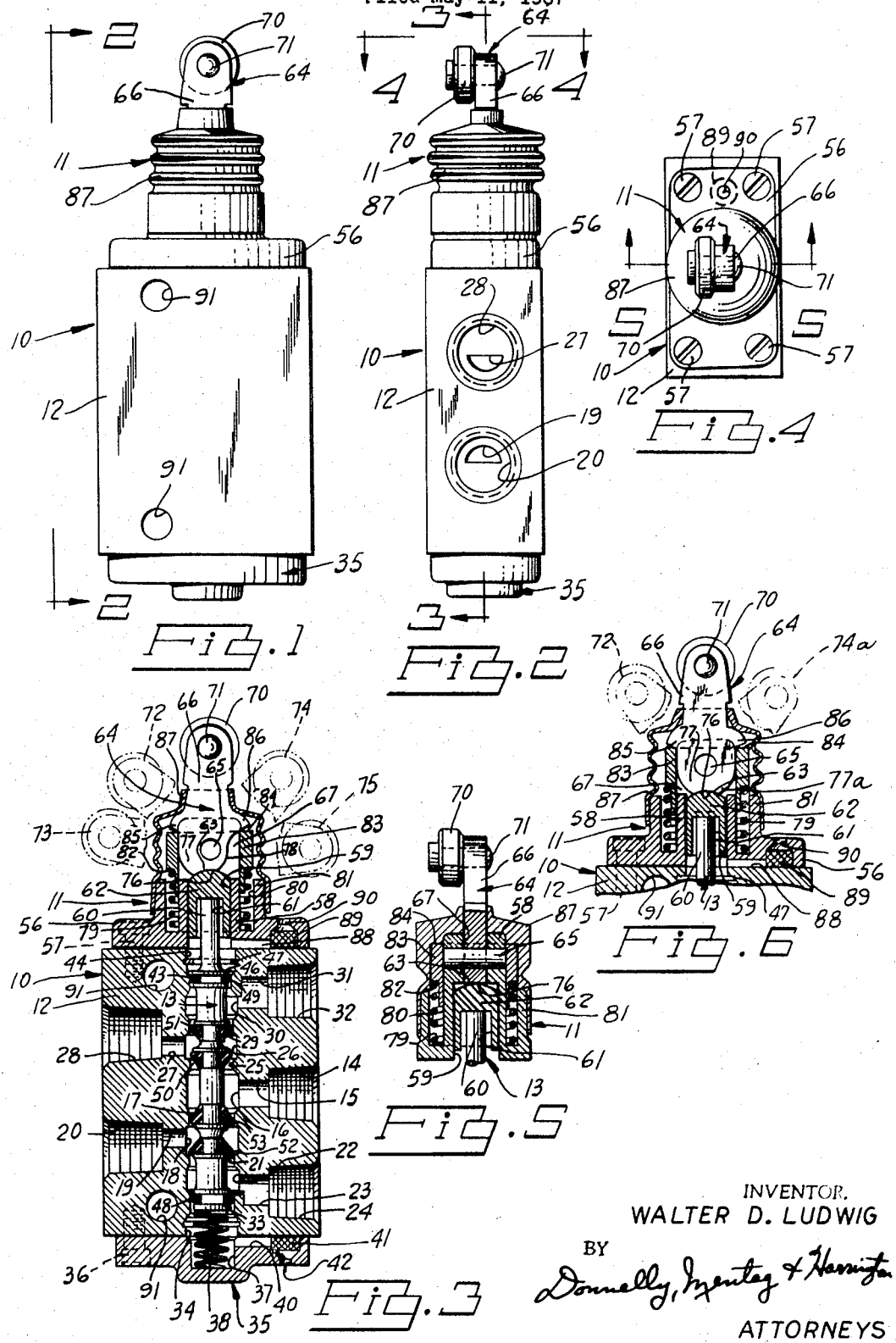

3,469,461
CAM OPERATOR
Walter D. Ludwig, Bloomfield, Mich., assignor to Mac Valves, Inc., Oak Park, Mich., a corporation of Michigan
Filed May 11, 1967, Ser. No. 637,750
Int. Cl. F16h 21/44, 21/54, 25/18
U.S. Cl. 74—107                              4 Claims

ABSTRACT OF THE DISCLOSURE

A cam operator having a pivotally mounted actuator member that carries a cam follower on the outer end thereof for engagement with a reciprocating machine slide or spindle, and a cam optionally contoured on the inner end for pushing or not pushing, as desired, an operating member, as a valve spool, when the actuator member is displaced in either direction from a central or neutral position by reciprocation, and means independent of said operating member for biasing the pivotal actuator member to a central or neutral position.

Summary of the invention

This invention relates to a cam operator incorporating a bi-directional pivotally mounted actuator member and a spring biased, inflexible sleeve for returning the actuator member from an actuated position to a normal inoperative position. The cam operator is advantageously useful for actuating the operating members of many different apparatuses. For example, cam operated valves have been provided theretofore but they have disadvantages which detract from their effectiveness, and in many instances cause malfunctioning of the valves. Many valves now available on the market incorporate external means, such as torsion springs, to return a cam member after it has been actuated. The external torsion springs used on these cam operated valves are expensive to manufacture and they are exposed to water and other lubricants used on machine tools for manufacturing purposes so that they are subject to rust, and clogging or binding by metal chips and other dirt which causes malfunctioning of the valves. A disadvantage of other prior art valves is that they are provided with cam operators which operate the valves when moved in one direction but which may accidentally operate the valves when moved in the other or non-operating direction. Accordingly, it is an important object of the present invention to provide an improved cam operator adapted for use on valves and which overcomes the aforementioned disadvantages of the prior art cam operators for valves.

It is another object of the present invention to provide a cam operator which incorporates a pivotally mounted actuator member that carries a cam contour for moving an operating member in a linear manner, and which is further provided with a spring biased, inflexible sleeve that engages the actuator member and returns the actuator member to its normal unactuated or inoperative position by means of a linear or straight-line return pushing action.

It is a further object of the present invention to provide an improved cam operator which is simple and compact in construction, economical to manufacture, and efficient in operation.

It is still another object of the present invention to provide an improved cam operator which incorporates an actuator member that is enclosed so as to prevent dirt, metal chips, coolant and other harmful materials from binding the actuator member and causing it to malfunction.

It is still another object of the present invention to provide a cam operator for pushing the operating member of an apparatus between a first position and a second position when actuated in one direction, and which is non-operative or overriding when actuated in the opposite direction.

It is still a further object of the present invention to provide a cam operator which incorporates an actuator member that is constructed and arranged so that when it is moved in an operating direction it will carry out an operating function for a predetermined amount of travel and will merely over-travel for continued movement in the operating direction to provide a safety factor to prevent damage to a valve or other apparatus being operated by the cam operator.

It is still a further object of the present invention to provide a cam operator for pushing the operating member of an apparatus between a first and second position and which comprises, a cam operator body member, an actuator member pivotally mounted on said cam operator body member and movable from a normal inoperative position to an actuated position by an external, laterally applied force to provide a pushing force on the operating member to move it from said first position to said second position, means intermediate the actuator member and said operating member for transmitting said pushing force to the operating member, and a linear pushing action return means mounted on said cam operator body member and engaged with said actuator member for returning the actuator member from an actuated position to said normal inoperative position.

Other objects, features and advantages of this invention will be apparent from the following detailed description, appended claims, and the accompanying drawing.

In the drawing:
FIG. 1 is an elevational view of a valve provided with an illustrative cam operator made in accordance with the principles of the present invention;
FIG. 2 is a left side view of the cam operator and valve structure illustrated in FIG. 1, taken along the line 2—2 thereof, and looking in the direction of the arrows;
FIG. 3 is an elevational section view of the cam operator and valve structure illustrated in FIG. 2, taken along the line 3—3 thereof, and looking in the direction of the arrows;
FIG. 4 is a top plan view of the cam operator structure illustrated in FIG. 2, taken along the line 4—4 thereof, and looking in the direction of the arrows;
FIG. 5 is a fragmentary, elevational section view of the cam operator structure illustrated in FIG. 4, taken along the line 5—5 thereof, and looking in the direction of the arrows; and,
FIG. 6 is a fragmentary, elevational section view of a modified cam operator made in accordance with the principles of the present invention, and this view is similar to the view of the cam operator of FIG. 3, but only a fragment of the valve is shown.

Referring now to the drawing, and in particular to FIGS. 1, 2 and 3, the numeral 10 generally indicates a valve which is operated by an illustrative cam operator made in accordance with the principles of the present invention and which is generally indicated by the numeral 11. The cam operator 11 has been illustrated in the drawing and described hereinafter as being used for actuating the axially shiftable valve spool or operating member of a four-way fluid flow control valve. However, it will be understood that the cam operator 11 of the present invention may be used to provide a straight line or linear pushing movement to the operating members of various other apparatuses requiring a linear actuation, as for example, the operating plunger of an externally operated safety switch or limit switch, and the like.

As shown in FIG. 3, the valve 10 comprises a valve body 12 which is provided with a shiftable valve spool or operating member generally indicated by the numeral 13. The valve body 12 is provided with a fluid inlet or supply port 14 for admitting fluid under pressure into the valve body, as for example air under pressure, from a suitable source. The fluid supply port 14 is connected by a fluid passage 15 to a fluid supply chamber 16. The fluid supply chamber 16 is connected by the aligned bore 17 to an aligned fluid chamber 18 which is connected by a fluid passage 19 to a first delivery port 20. The fluid chamber 18 is also adapted to be connected by the communicating aligned bore 21 to a first fluid exhaust chamber 22 which is connected by the fluid passage 23 to a first fluid exhaust port 24. The fluid supply chamber 16 is also connected by the aligned bore 25 to a fluid chamber 26 which is connected by a fluid passage 27 to a second fluid delivery port 28. The fluid chamber 26 is also connected by the aligned bore 29 to a second fluid exhaust chamber 30 which is connected by the fluid passage 31 to a second fluid exhaust port 32.

As shown in FIG. 3, the first fluid exhaust chamber 22 is connected by the aligned bore 33 to an enlarged bore 34 that opens to the exterior of the valve body 12 at what may be termed the lower end of said vlave body. The bore 34 is enclosed by an end cap 35 which is secured to the valve body 12 by any suitable means, as by a plurality of screws 36. The end cap 35 includes a cylindrical recess 37 which is aligned with the bore 34 so as to form a spring chamber for a return spring 38. The return spring 38 normally maintains the valve spool 13 in the position shown in FIG. 3. The recess 37 and the bore 34 is vented to the atmosphere by the transverse passage 40, the filter 41 and the passage 42.

As shown in FIG. 3, the fluid exhaust chamber 30 communicates with the exterior of the valve body 12 through the aligned bore 43 and the enlarged bore 44. A retainer ring 47 is releasably mounted in the bore 44.

The valve spool 13 is provided with suitable annular sealing members 48 and 49 which are in slidable, sealing engagement with the surfaces of the bores 33 and 43, respectively. The valve spool 13 is provided with a first pair of valve seals 50 and 51 which are adapted to alternately engage the bores 25 and 29, respectively. The valve spool 13 is provided with a first pair of valve seals 50 and 51 which are adapted to alternately engage the bores 25 and 29, respectively. The valve spool 13 is provided with a second pair of valve seals 52 and 53 which are adapted to alternately engage the bores 21 and 17, respectively.

In the position shown in FIG. 3, the valve spool 13 is in a first position with the valve seal 50 in an inoperative position so as to permit flow of fluid from the fluid supply chamber 16 into the fluid chamber 26. The valve seal 51 is in sealing engagement with the bore 29 to block the flow of fluid into the second exhaust chamber 30. The valve seal 53 is in a position blocking the bore 17, and the valve seal 52 is in an inoperative position to permit flow of fluid from the delivery chamber 18 into the first exhaust chamber 22. The cam operator 11 is adapted to shift the valve spool 13 inwardly from the first position shown in FIG. 3 to a second position, to change the direction of the fluid flow through the valve so that the delivery chamber 18 would receive fluid under pressure from the supply chamber 16, and the fluid chamber 26 would be exhausted, It will be understood that the aforedescribed valve is illustrative of only one type of valve which may be operated by the cam operator 11 of the present invention.

As best seen in FIGS. 3 and 4, the cam operator 11 comprises cam operator body member 56 which is secured to the upper end of the valve body 12 by any suitable means, as by a plurality of screws 57. As shown in FIG. 3, the cam operator body includes a centrally located, upwardly extended, integral cylindrical portion 58 which is provided with an axial bore 59 which communicates with the bore 44 in the valve body 12. The valve spool 13 is provided with an integral operating shaft 60 which extends into the bore 61 formed in the rear end of a cylindrical bushing or cam follower 62 that is made from any suitable material as a plastic material. The bushing 62 is slidably mounted in the axial bore 59 in the cam operator body portion 58. The nose or front end 63 of the bushing 62 is contoured to a spherical surface.

As shown in FIGS. 3 and 5, an actuator member, generally indicated by the numeral 64, is pivotally mounted on a pivot pin 65 which is operatively mounted on the cam operator body portion 58 adjacent the outer end thereof. The actuator member 64 comprises an elongated, plate-like arm 66 that extends outwardly through the slot 67 which is formed through the outer end of the cam operator body portion 58 and which communicates with the bore 59, so that the actuator member 64 may be pivoted clockwise and counterclockwise about the axis of the pivot pin 65. A cam roller 70 is rotatably mounted on a pivot pin 71 at the outer end of the actuator arm 66.

The inner end of the actuator member 64 comprises a cam which is contoured to a predetermined shape so that when the actuator member 64 is rotated by an external, laterally applied force to the left, or counterclockwise, to the broken-line position 72, as viewed in FIG. 3, the cam follower or bushing 62 will be actuated downwardly to contact the valve spool 13 and shift it inwardly to a second position to reverse the flow of fluid through the valve 10. Continued movement or overtravel by the external dog or other machine member applying the external force may move the actuator member 64 to the extreme broken-line position 73 without causing any further inward movement of the cam follower 62 so as to prevent damage to the valve 10. The cam on the inner end of the actuator member 64 is further contoured so that when the actuator member 64 is pivoted to the right, or clockwise, to the broken-line position 74 shown in FIG. 3, the valve spool 13 will not be actuated and the actuator member 64 will override the cam follower or bushing 62. Continued movement of the actuator member 64 in the clockwise direction may move the actuator member 64 to the extreme broken-line override position 75 without causing any inward movement of the cam follower 62.

The cam on the inner end of the actuator member 64 shown in FIG. 3 may thus be termed an overriding or one-way cam which functions like a one-way trip switch and which comprises three portions or shapes. This one-way cam includes a central, concave inwardly shaped first portion 76 which is engaged by the rounded nose of the cam follower 62 when the actuator member 64 is in the normal, central, inoperative position. As viewed in FIG. 3, the one-way cam is provided with a convexly shaped left side or second portion 77 adjacent the first portion 76, and it is the leading part of this second portion which engages the cam follower 62 during the counterclockwise, operating rotative movement of the actuator member 64 and forces the cam follower 62 and the valve spool 13 inwardly relative to the valve body 12. The trailing part of the cam second portion 77 provides the cam with an overtravel capability whereby continued or further movement in the operative direction will not cause any further inward movement of the cam follower 62. This overtravel capacity provides a safety factor which prevents damage to the apparatus being operated. The overtravel capacity of the cam operator takes in account and allows for the machine tolerances in the various parts of the cam operator and the apparatus being operated. It also prevents damage which may be caused by inaccurate settings of the machine dog or slide actuating the cam operator. The third portion of the overriding cam is indicated by the numeral 78 and it is also provided with a convex or outwardly curved shape leading part and a concave inwardly trailing part. The radius of the convex leading part is smaller than the radius of the second curved portion 77 whereby, when the actuator member 64 is pivoted clockwise, as viewed in FIG. 3, the cam surface 78 will merely ride over the rounded end surface of the cam follower 62 without moving it from the position shown in FIG. 3.

The actuator member 64 is returned from any of the broken-line positions 72, 73, 74 and 75 by the return compression spring 79, as shown in FIGS. 3 and 5. The return spring 79 is seated in the circular groove 80 which is formed between the cam operator body portion 58 and the shorter cylindrical cam operator body shoulder portion 81. The outer end of the return spring 79 abuts the shoulder 82 formed on the inner end of the cylindrical, inflexible sleeve 83 which is slidably mounted on the outer surface of the cam operator body portion 58. The outer end 84 of the sleeve 83 engages the oppositely disposed cam members or lobes 85 and 86 which are integrally formed on the opposite sides of the actuator member 64. The cam members 85 and 86 are spaced apart axially from the overriding cam on the inner end of the actuator member 64, and they are also disposed outwardly of said overriding cam. It will be seen, that when the actuator member 64 is rotated counter-clockwise to the broken line positions 72 or 73, the cam lobe 85 will engage the sleeve outer end 84 and compress the return spring 79. The return spring 79 functions with the sleeve 83 to return the actuator member 64 to the position shown in FIG. 3 after the external laterally applied actuating force has been disengaged from the cam follower 70. It will be understood that other suitable cam followers could be used on the upper end of the actuator member 64 in place of the cam roller 70. The cam lobe 86 functions to compress the return spring 79 in the same manner when the actuator member 64 is rotated clockwise to the broken-line positions 74 or 75.

It will be seen that the sleeve 83 transmits the return biasing action of the return spring 79 against whichever cam lobe 85 or 86 was used to move the sleeve 83 inwardly during an actuation movement. It will be understood that any suitable biasing means other than a spring may be used for carrying out the return biasing function of the spring and that any suitable elongated inflexible member may be used in lieu of the sleeve 83 to carry out the function of the sleeve to transmit and guide the biasing action of the spring 79 in a straight-line action to the cam lobes 85 and 86. It will also be seen that the co-action of the return spring 79 and the inflexible sleeve 83 provides a linear or straight-line pushing force in a direction opposite to the pushing force exerted on the operating member or valve spool 13 when the actuator member 64 is pivoted from its central or inoperative position. The contact edges of the cam lobes 85 and 86 are preferably provided with a rounded or flared engaging surface for engaging the outer end 84 of the sleeve 83.

FIG. 6 illustrates a slightly modified cam operator 11 having a two-way cam which is adapted to shift the valve spool 13 when the actuator member 64 is moved to either one of the broken line positions 72 or 74a, that is, the second and third portions of the cam on the inner end of the actuator member 64 are contoured identically so as to move the valve spool 13 inwardly when the actuator member 64 is moved either clockwise or counter-clockwise. The broken line position 74a would be an operative position for the actuator member 64, and the actuator member 64 would be capable of over-travelling movements to the broken line positions 73 and 75 of FIG. 3 without causing the valve spool 13 to shift.

As shown in FIG. 6, the two-way cam on the inner end of the actuator member 64 is a double-acting cam and it includes the same first and second cam portions 76 and 77 which are used on the one-way cam of FIG. 3. However, the third cam portion shown on the two-way cam in FIG. 6 is formed to the same shape as the second cam portion 77 of the cam of FIG. 3 and it has been marked with the same reference numeral followed by the small letter "a."

As shown in FIGS. 3, 4 and 6, each of the cam operator species is enclosed by a resilient cover or boot 87 that is made from any suitable material, as for example, rubber. The boot 87 shields the cam operator structure from contamination by water or other coolants, dirt, metal shavings, and so forth. The cam operator 11 is vented by the passage 88, the filter 89, and the passage 90.

In the illustrated use of the cam operator 11 of the present invention, the valve 10 is mounted in any desired location on the member on which it is to be used, as for example, a machine member, by any suitable means, as by a pair of screws disposed in the mounting holes 91. The valve 10 is mounted in a position so that the cam roller 70 can be engaged and actuated by a cam, a dog, a machine slide or other actuating member to move it to either one of the operative broken-line positions 72 or 74a, depending upon the desired control action. In some instances, it is desirable to actuate the valve 10 when the actuator member 64 moves in one direction and to have the valve spool 13 remain inactive during the movement of the actuator member 64 in the other direction, and in that case, the one-way cam operator illustrated in FIG. 3 would be used. When it is desired to effect a valve operation upon movement of the actuator member 64 in each direction, the two-way cam operator shown in FIG. 6 would be employed. It will be understood that the cam operator 11 may be mounted on either end of the valve 10. The cam operator 11 may also be rotated to various positions on the valve 10, as for example, to a position rotated 90° from the position shown in FIG. 4.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A cam operator for pushing the operating member of an apparatus between a first and second position, comprising:
 (a) a cam operator body member;
 (b) an actuator member pivotally mounted on said cam operator body member and pivotal from a normal inoperative position to an actuated position by a laterally applied external force to provide a pushing force on an apparatus operating member to move it from a first position to a second position;
 (c) a linear pushing action return means, independent of the apparatus operating member, mounted on said cam operator body member and engaged with said actuator member for returning the actuator member from an actuated position to the normal inoperative position; and,
 (d) said linear pushing action return means including,
   (1) an elongated inflexible member having one end engaged with said actuator member;
   (2) a biasing means engaging the said elongated inflexible member for biasing the elongated inflexible member axially against the actuator member to provide a straight-line pushing force on the actuator member to return it from an actuated position to the normal inoperative position; and,
   (3) said elongated inflexible member comprising a sleeve member.

2. A cam operator for pushing the operating member of an apparatus between a first and second position, comprising:
 (a) a cam operator body member;
 (b) an actuator member pivotally mounted on said cam operator body member and pivotal from a normal inoperative position to an actuated position by a laterally applied external force to provide a pushing force on an apparatus operating member to move it from a first position to a second position;
 (c) a linear pushing action return means, independent of the apparatus operating member, mounted on said cam operator body member and engaged with said actuator member for returning the actuator member from an actuated position to the normal inoperative position;

(d) means for transmitting said linear pushing force to the operating member;

(e) said means for transmitting said linear pushing force to the operating member including, (1) a cam follower movably mounted on said cam operator body member and contacting said operating member; and, (2) a cam contour on the inner end of the pivotally mounted actuator member engaged with said cam follower for moving said cam follower and operating member when the actuator member is pivoted in at least one direction by said laterally applied external force; and, (f) said cam contour on the inner end of the actuator member comprising a cam contour which is operative to move the cam follower and operating member when the actuator member is pivoted for a certain arcuate movement in an operative direction, and which is operative to overtravel the cam follower when the actuator member is pivoted for an additional arcuate movement beyond said certain arcuate movement.

3. A cam operator for pushing the operating member of an apparatus between a first and second position, comprising:

(a) a cam operator body member having a bore extended axially therein from one end thereof;

(b) an actuator member having an inner end and an outer end and being pivotally mounted on said cam operator body member and pivotal from a normal inoperative position to an actuated position by a laterally applied external force to provide a pushing force on an apparatus operating member to move it from a first position to a second position;

(c) a cam follower movably mounted in said bore in the cam operator body member and being in contact with said operating member;

(d) said actuator member having the inner end thereof disposed in said bore and provided with a cam contour on said inner end for engaging said cam follower, whereby when the outer end of the actuator member is engaged by said laterally applied external force the actuator member will be pivoted and the cam contour will move the cam follower and the operating member between said first and second positions;

(e) a linear pushing action return means mounted on said cam operator body member and engaged with said actuator member for returning the actuator member from an actuated position to said normal inoperative position;

(f) said linear pushing action return means including, an elongated inflexible member having one end engaged with said actuator member, and, a biasing means engaging the elongated inflexible member for biasing the elongated inflexible member axially against the actuator member to provide a straight-line pushing force on the actuator member to return it from an actuated position to the normal inoperative position; and, (g) said elongated inflexible member comprising a sleeve member.

4. A cam operator for pushing the operating member of an apparatus between a first and second position, comprising:

(a) a cam operator body member having a bore extended axially therein from one end thereof;

(b) an actuator member having an inner end and an outer end and being pivotally mounted on said cam operator body member and pivotal from a normal inoperative position to an actuated position by a laterally applied external force to provide a pushing force on an apparatus operating member to move it from a first position to a second position;

(c) a cam follower movably mounted in said bore in the cam operator body member and being in contact with said operating member;

(d) said actuator member having the inner end thereof disposed in said bore and provided with a cam contour on said inner end for engaging said cam follower, whereby when the outer end of the actuator member is engaged by said laterally applied external force the actuator member will be pivoted and the cam contour will move the cam follower and the operating member between said first and second positions;

(e) a linear pushing action return means, independent of the apparatus operating member, mounted on said cam operator body member and engaging with said actuator member for returning the actuator member from an actuated position to said normal inoperative position; and, (f) said cam contour on the inner end of the actuator member comprising a cam contour which is operative to move the cam follower and operating member when the actuator member is pivoted for a certain arcuate movement in an operative direction, and which is operative to overtravel the cam follower when the actuator member is pivoted for an additional arcuate movement beyond said certain arcuate movement.

References Cited
UNITED STATES PATENTS

| | | | |
|---|---|---|---|
| 1,707,040 | 3/1929 | Belknap | 251—263 |
| 2,766,772 | 10/1956 | Welty et al. | 74—107 |
| 2,980,387 | 4/1961 | Devlin | 251—263 |
| 3,026,908 | 3/1962 | Blair | 251—263 |
| 3,252,345 | 5/1966 | Russell | 74—107 |
| 3,279,748 | 10/1966 | Coulter | 74—107 |
| 2,625,620 | 1/1953 | Hasselbaum | 74—18.1 |

FRED C. MATTERN, Jr., Primary Examiner

F. D. SHOEMAKER, Assistant Examiner

U.S. Cl. X.L.
137—630.2; 251—263

PO-1050
(5/69)

UNITED STATES PATENT OFFICE
CERTIFICATE OF CORRECTION

Patent No. 3,469,461            Dated September 30, 1969

Inventor(s) Walter D. Ludwig

It is certified that error appears in the above-identified patent and that said Letters Patent are hereby corrected as shown below:

Column 1, line 3, "Bloomfield" should be --Bloomfield Township--; line 32, "theretofore" should be --heretofore--. Column 3, lines 42-45, cancel "The valve...respectively."; line 62, after "exhausted" the "comm should be a period. Column 8, line 32, "engaging" should be --engaged--

SIGNED AND
SEALED
MAY 5 1970

(SEAL)
Attest:

Edward M. Fletcher, Jr.
Attesting Officer

WILLIAM E. SCHUYLER, JR.
Commissioner of Patents